(12) United States Patent
Yang et al.

(10) Patent No.: US 8,252,446 B2
(45) Date of Patent: Aug. 28, 2012

(54) BATTERY COVER ASSEMBLY FOR PORTABLE ELECTRONIC DEVICE

(75) Inventors: Mu-Wen Yang, Taipei (TW); Chih-Chiang Chang, Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 396 days.

(21) Appl. No.: 12/649,570

(22) Filed: Dec. 30, 2009

(65) Prior Publication Data

US 2010/0273037 A1    Oct. 28, 2010

(30) Foreign Application Priority Data

Apr. 24, 2009    (CN) .......................... 2009 1 0301815

(51) Int. Cl.
*H01M 2/10*    (2006.01)

(52) U.S. Cl. ...................................................... 429/100
(58) Field of Classification Search .................... 429/96, 429/99, 100; 455/550.01, 575.1, 575.8, 90.3; 361/726, 732, 679.01
See application file for complete search history.

*Primary Examiner* — Ula C. Ruddock
*Assistant Examiner* — Thomas H. Parsons
(74) *Attorney, Agent, or Firm* — Altis Law Group, Inc.

(57) ABSTRACT

A battery cover assembly for a portable electronic device includes a housing, a battery cover, a pivot member and two latch members. The housing forms two support stages at two sides thereof. The battery cover forms two extending portions corresponding to the support stages. Each support stage forms two protrusions. The pivot member rotatably connects the battery cover to the housing. The two latch members are attached to the support stages. Each latch member includes two receiving spaces receiving a corresponding protrusion. Each latch member deforms to allow the battery cover to releasably latch to the housing.

8 Claims, 5 Drawing Sheets

BATTERY COVER ASSEMBLY FOR PORTABLE ELECTRONIC DEVICE

CROSS-REFERENCE TO RELATED APPLICATIONS

This application is related to two co-pending U.S. patent application Ser. Nos. 12/649,565 and 12/649,561, both entitled "BATTERY COVER ASSEMBLY FOR PORTABLE ELECTRONIC DEVICE", by MU-WEN YANG et al. Such applications have the same assignee as the instant application and have been concurrently filed herewith. The disclosures of the above identified applications are incorporated herein by reference.

BACKGROUND

1. Technical Field

The present disclosure generally relates to battery cover assemblies and, particularly, to a battery cover assembly for use in a portable electronic device.

2. Description of Related Art

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. The batteries have to be replaced by opening the battery covers when, for example, the batteries are damaged and/or dead (i.e. no longer rechargeable).

Although battery cover assemblies may be simple, the engagement between the battery cover and the housing of the mobile phone can be too firm to be easily detached from each other.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION OF THE EMBODIMENTS

Figure 1:
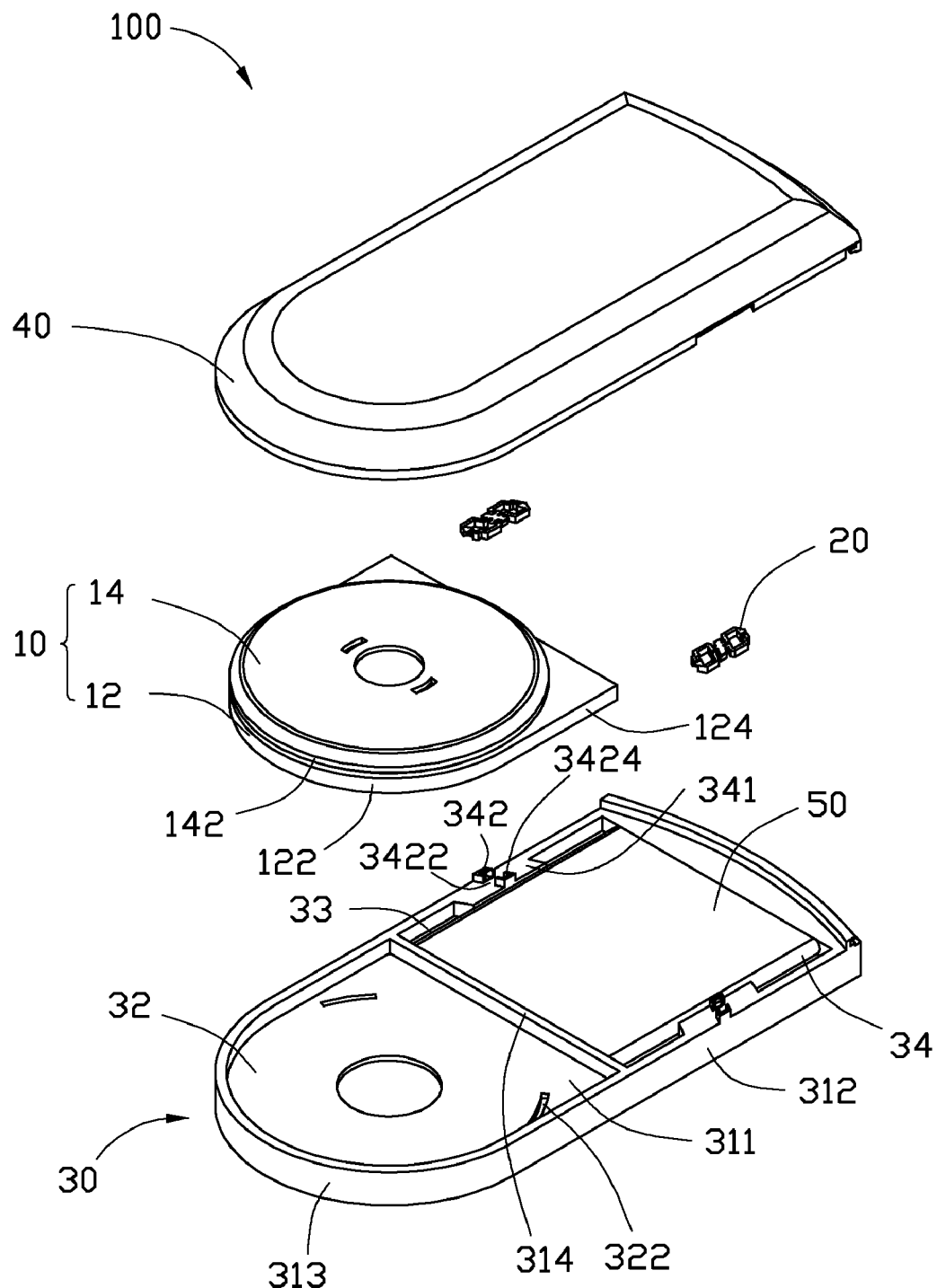
FIG. 1 is an exploded, isometric view of a portable electronic device employing a battery cover assembly in accordance with an exemplary embodiment.
Figure 2:
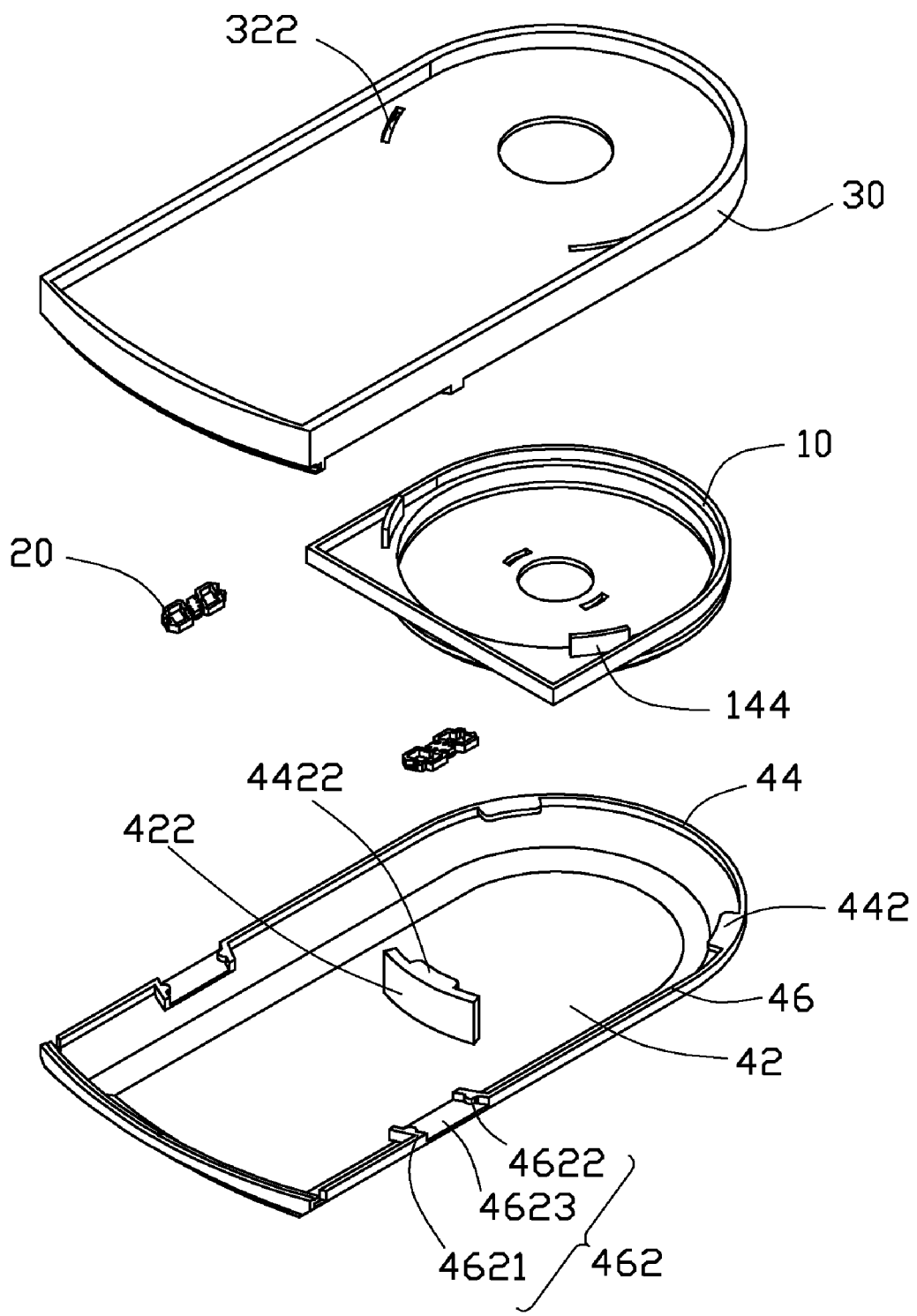
FIG. 2 is similar to FIG. 1, but viewed from another aspect.

FIGS. 1 and 2 show a portable electronic device 100, such as a mobile phone, employing a battery cover assembly. The mobile phone 100 is an exemplary application, for the purposes of describing details of an exemplary embodiment of a battery cover assembly. The battery cover assembly incorporates a pivot member 10, two latch members 20, a housing 30, and a battery cover 40. The pivot member 10 rotatably connects the battery cover 40 to the housing 30. The latch members 20 releasably latch the battery cover 40 to the housing 30.

The pivot member 10 includes a base plate 12 and a rotatable disk 14 mounted on the base plate 12. The base plate 12 includes a semi-circular portion 122 tangentially connected to a rectangular portion 124. The rotatable disk 14 is coaxial with the semi-circular portion 122. A ring groove 142 is defined in an outermost circumferential edge of the rotatable disk 14 toward the base plate 12. The base plate 12 has two arcuate ribs 144 defined adjacent to and coaxial with a circumference of the rotatable disk 14.

Figure 3:
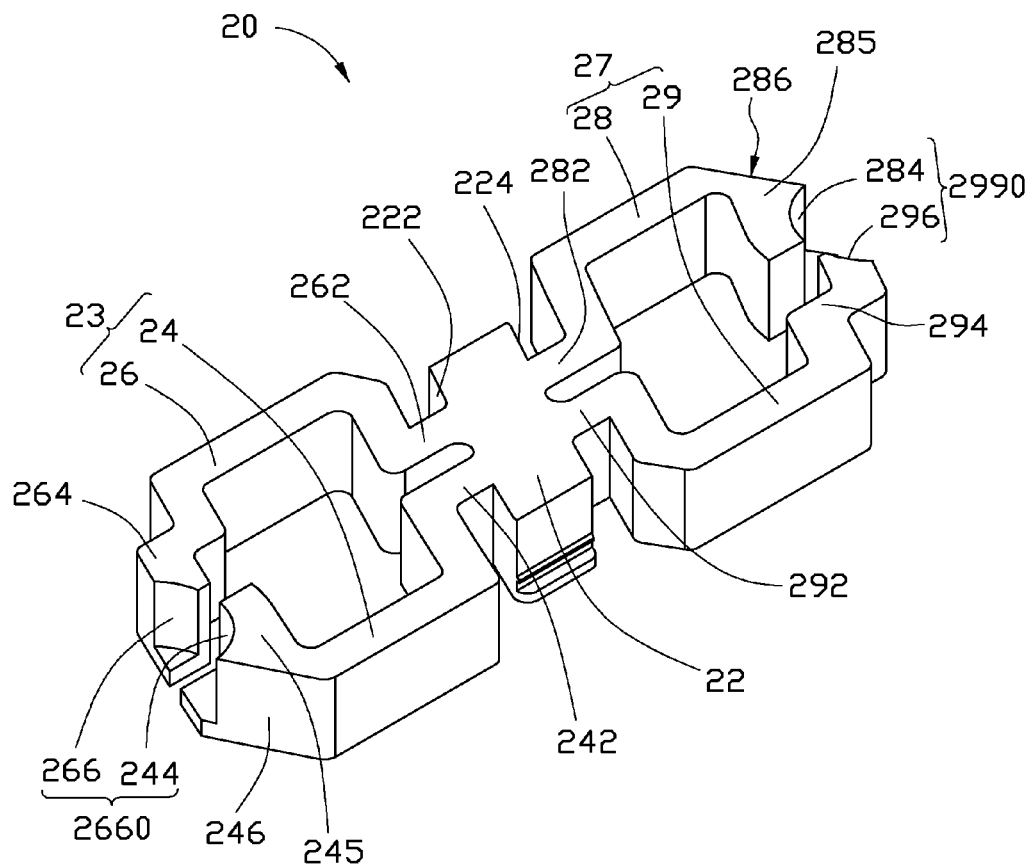
FIG. 3 is an enlarged view of the latch member shown in FIG. 1.

Referring to FIG. 3, each latch member 20 includes a fixed portion 22, a first deformable portion 23, and a second deformable portion 27. The first deformable portion 23 includes two bending arms 24, 26. The second deformable portion 27 also includes two bending arms 28, 29.

The fixing portion 22 includes a first surface 222 and a second surface 224. One end of the bending arm 24 forms a first connected portion 242 extending from the first surface 222. The other end of the bending arm 24 forms a resisting portion 245. The resisting portion 245 forms a first wedged surface 246 and a first notch 244. One end of the bending arm 26 forms a second connected portion 262 extending from the first surface 222. The first connected portion 242 is opposite to the second connected portion 262. The other end of the bending arm 26 forms a stopper portion 264. A middle portion of each bending arm 24, 26 is substantially U-shaped, and are opposite to each other to allow the bending arms 24, 26 to be deformed towards and away from each other. The bending arms are for forming a deformable jaw-like shape and therefore can be other than U-shaped. The resisting portion 245 is opposite to the stopper portion 264. The stopper portion 264 forms a second notch 266. The first notch 244 and the second notch 266 define a first receiving space 2660. One end of the bending arm 28 forms a first connected portion 282 extending from the second surface 224. The other end of the bending arm 28 forms a resisting portion 285. The resisting portion 285 forms a second wedged surface 286 and a first notch 284. The first, second wedge surface 146, 286 are arranged in diagonal. One end of the bending arm 29 forms a second connected portion 292 extending from the second surface 224. The other end of the bending arm 29 forms a stopper portion 294. The resisting portion 285 is opposite to the stopper portion 294. The stopper portion 294 forms a second notch 296. The first notch 284 and the second notch 296 define a second receiving space 2990.

The housing 30 includes a base body 311, two sidewalls 312 and a semi-circular wall 313. A beam 314 divides the base body 311 into a groove 32 for receiving the base plate 124 and a cavity 33 for receiving a battery 50. The base body 311 in the groove 32 defines two latching slots 322 for receiving the ribs 144 of the pivot member 10. Each sidewall 312 forms a support stage 341 extending into the cavity 33. The support stage 341 includes two frames 342 and a gap 3422 therebetween. Each frame 342 has an opening end, thereby defining a containing groove 3424 for latching the fixing portion 22 of each latch member 20. The gaps 3422 receive the first, second connecting portions 262, 242, 282, 292.

The battery cover 40 includes a back wall 42, a semi-circular edge 44, and two sides edges 46. An arcuate block perpendicularly protrudes from back wall 42. A projection 4422 perpendicularly extends from arcuate block 422. The semi-circular edge 44 extends two spaced tabs 422. The tabs 422 and projection 4422 respectively engage in the loop groove 142 of the rotatable disk 14. Each side edge 46 forms an extending portion 462. The extending portion 462 includes two flanges 4621 and an opening 4623 therebetween. Each flange 4621 extends a protrusion 4622.

Figure 4:
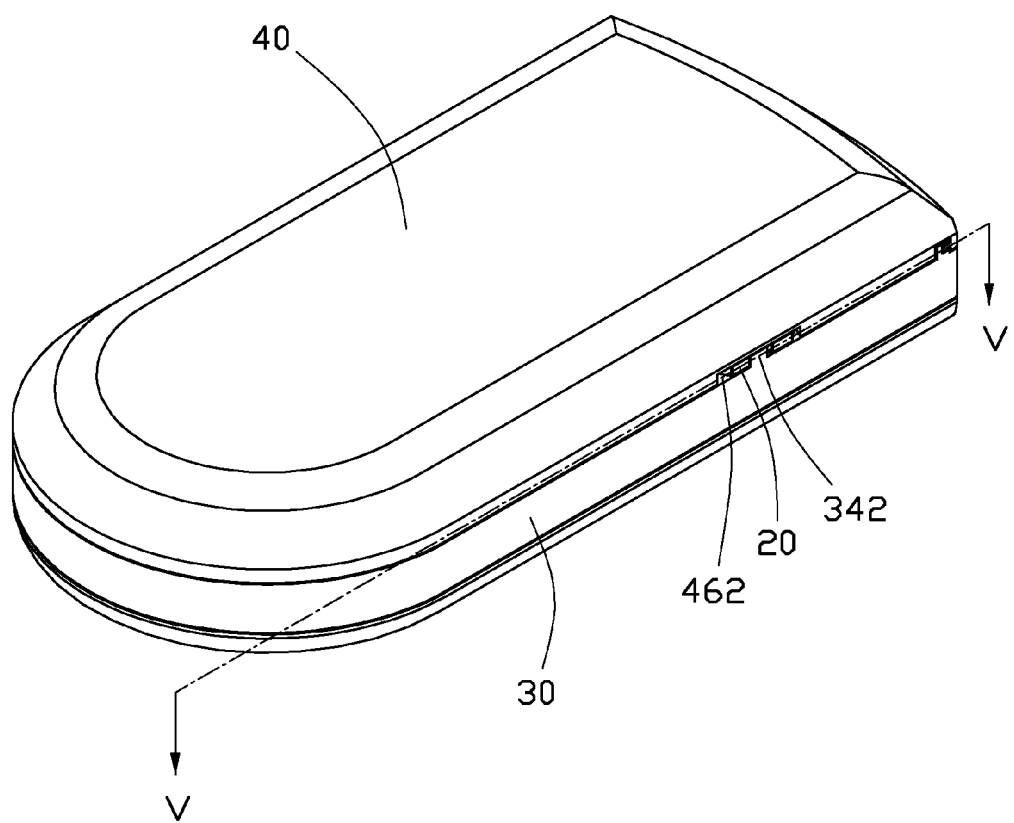
FIG. 4 is an assembly view of FIG. 1.
Figure 5:
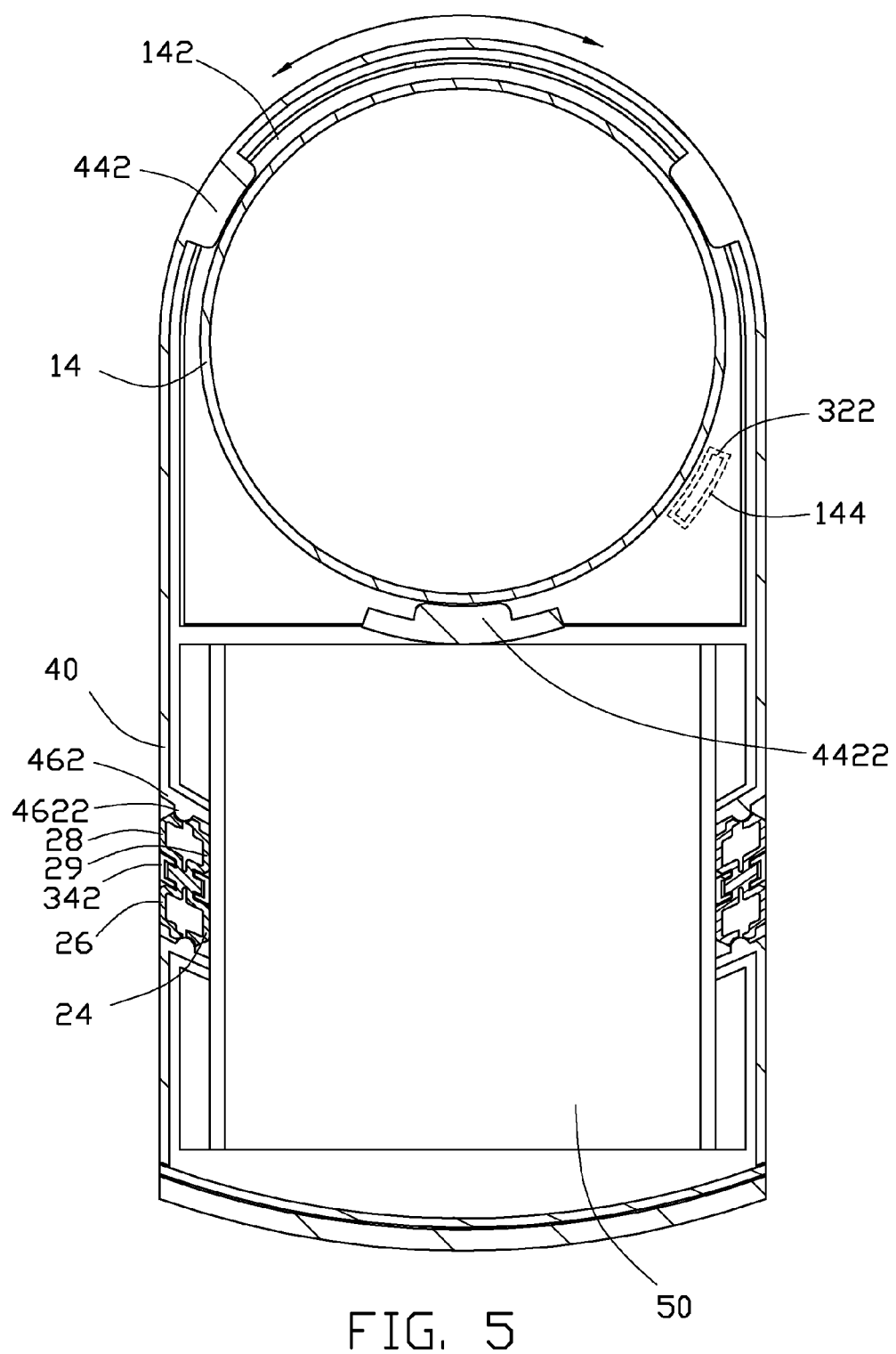
FIG. 5 is a cross sectional view of the battery cover assembly of FIG. 4.

During assembly of the battery cover assembly, referring to FIGS. 4 and 5, firstly, the latch members 20 are attached to the housing 30. The fixing portions 22 are respectively latched into the containing grooves 3424. The first, second connecting portions 242, 282, 262, 292 are received in the gaps 3422. Then, the base plate 12 is received in the groove 32, and the ribs 144 are latched into the latching slots 322 to cause the pivot member 10 to be mounted to the housing 30. Then, the projection 4422, tabs 422 of the battery cover 40 are received in the loop groove 142 of the pivot member 10. Thus, the battery cover 40 is rotatably connected to the housing 30. When the battery cover 40 is rotated to align with the housing 30, the battery cover 40 is pressed toward the housing 30. The latch members 20 are received in the openings 4623, and the protrusions 4622 are received in the first receiving space 2660 and the second receiving space 2990. Thus, the battery cover 40 is assembled in the housing 30.

When the battery cover 40 is to be opened, the battery cover 40 is rotated counter-clockwise according to the arrow direction of FIG. 5. The protrusions 4622 press the bending arms 26, 29. The bending arms 26, 29 are deformed to allow the protrusions 4622 to exit from the first, second receiving spaces 2660, 2990. The battery cover 40 may be rotated to a predetermined position. When the battery cover 40 is to be closed, the battery cover 40 is rotated clockwise. The protrusions 4622 firstly slide the first, second wedge surfaces 246, 286 to press the bending arms 26, 29 to deform until the protrusions 4622 are latched into the first, second receiving spaces 2660,2990. The bending arms 24, 28 are automatically returned to an original position.

As described above, the exemplary embodiment provides a battery cover assembly for portable electronic devices, such as mobile phones. The battery cover of the battery cover assembly can be easily opened. This rotating removal step makes the operation of the device more user-friendly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery cover assembly for a portable electronic device, the battery cover assembly comprising:
   a housing forming two support stages at two sides thereof;
   a battery cover forming two extending portions corresponding to the support stages; each support stage forming two protrusions;
   a pivot member rotatably connecting the battery cover to the housing; and
   two latch members directly attached to the support stages, each latch member including two receiving spaces receiving a corresponding protrusion, each latch member deforming to allow the battery cover to releasably latch to the housing,
   wherein the support stage has two spaced frames and a gap therebetween, the two frames defining a containing groove latching the latch member.

2. The battery cover assembly as claimed in claim 1, wherein each latch member includes a fixed portion, a first deformable portion, and a second deformable portion, and the first deformable portion and the second deformable portion respectively extend from two sides of the fixed portion.

3. The battery cover assembly as claimed in claim 2, wherein the first deformable portion and the second deformable portion each include two bending arms.

4. The battery cover assembly as claimed in claim 3, wherein one end of one of the bending arms form a first connected portion, the other end of the bending arms form a resisting portion defining a first notch, one end of another of the bending arms forms a second connected portion, the other end of the bending arm forms a stopper portion, the resisting portion is opposite to the stopper portion, the stopper portion forms a second notch, and the first notch and the second notch define the first receiving space.

5. The battery cover assembly as claimed in claim 4, wherein the resisting portion forms a wedged surface adjacent to the first notch.

6. The battery cover assembly as claimed in claim 1, wherein the extending portion includes two flanges and an opening, and the protrusion extends from each flange.

7. The battery cover assembly as claimed in claim 1, wherein the pivot member includes a base plate and a rotatable disk formed on the base plate, a ring groove is defined at one side of the rotatable disk toward the base plate, and the base plate defines a plurality of ribs.

8. The battery cover assembly as claimed in claim 7, wherein the base plate includes a semi-circular portion and a rectangular portion tangentially connected to each other, and the rotatable disk is concentric with the semi-circular portion.

* * * * *